United States Patent [19]
Shinjo

[11] Patent Number: 5,984,096
[45] Date of Patent: Nov. 16, 1999

[54] BELT FOR HOLDING AND CARRYING A ROW OF SELF-DRILLING REAM SCREWS

[75] Inventor: Katsumi Shinjo, Osaka, Japan

[73] Assignee: Yugenkaisha Shinjo Seisakusho, Osaka, Japan

[21] Appl. No.: 09/112,209

[22] Filed: Jul. 9, 1998

[51] Int. Cl.⁶ ................................................. B65D 85/24
[52] U.S. Cl. .......................................... 206/347; 206/346
[58] Field of Search ................................ 206/338, 341, 206/346, 347; 411/441, 442, 444

[56] References Cited

U.S. PATENT DOCUMENTS

| | | | |
|---|---|---|---|
| 5,522,687 | 6/1996 | Chen | 206/347 X |
| 5,544,746 | 8/1996 | Dohi | 206/346 |
| 5,775,514 | 7/1998 | Lin | 206/347 |
| 5,778,445 | 8/1998 | Huang | 206/347 X |
| 5,779,420 | 7/1998 | Huang | 206/347 X |
| 5,803,691 | 9/1998 | Huang | 206/347 X |

FOREIGN PATENT DOCUMENTS

| | | | |
|---|---|---|---|
| 2533672 | 2/1976 | Germany | 206/347 |
| 2520358 | 5/1996 | Japan . | |

Primary Examiner—Bryon P. Gehman
Attorney, Agent, or Firm—Antonelli, Terry, Stout & Kraus, LLP

[57] ABSTRACT

A belt (10) has cylinders (12) formed integral with a body (11) to hold a row of self-drilling reaming screws (20) each having a head (25), a threaded shank (21), a drill tip (22) and reaming blades (23) disposed on the tip and near the shank. The belt further has slits (13) extending radially from each cylinder, and lateral cutouts (15) intermittently drive the belt at the same pitch as the cylinders. Each cylinder is prismoidal between its wider inlet and narrower outlet so that a distance A between the cylinder's walls gradually decreases towards the outlet, but at the inlet this distance is substantially equal to the diameter $d_1$ of an envelope circle of the blades. Inner edges (13a) of the slits (13) facing one another and disposed in and from the regions' inlet sides are spaced also the same distance B as the diameter $d_1$ so that each screw can take a correct position on and perpendicular to the belt, thus enabling it to be loaded with the screws smoothly and efficiently.

2 Claims, 5 Drawing Sheets

FIG. 7 (a)
FIG. 7 (b)
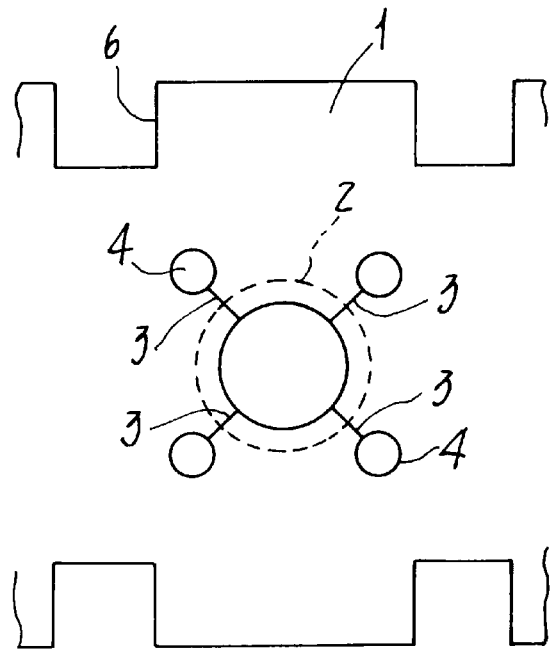
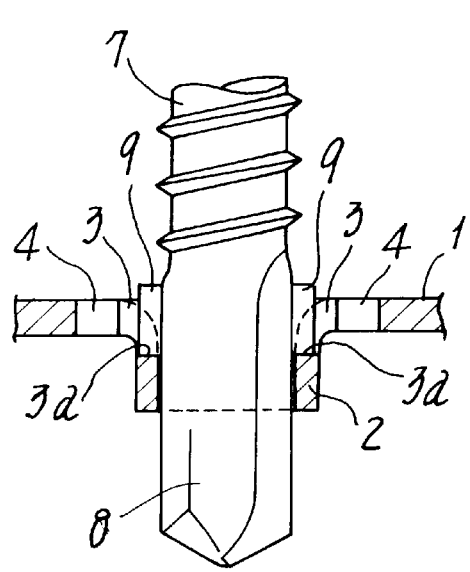
FIG. 8 (a)
FIG. 8 (b)
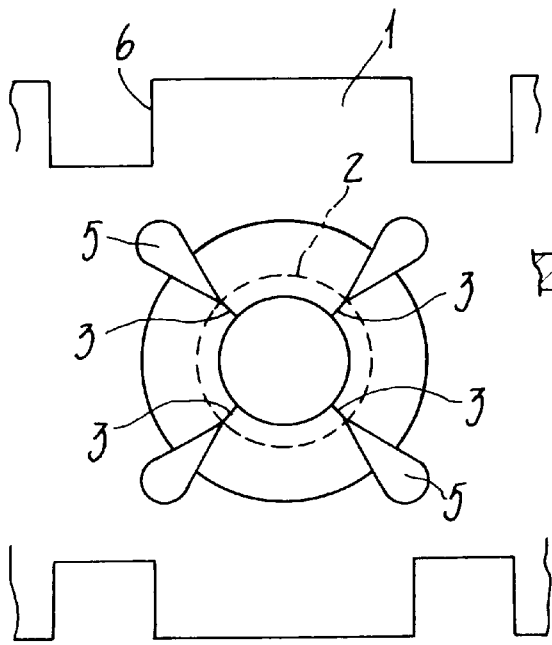
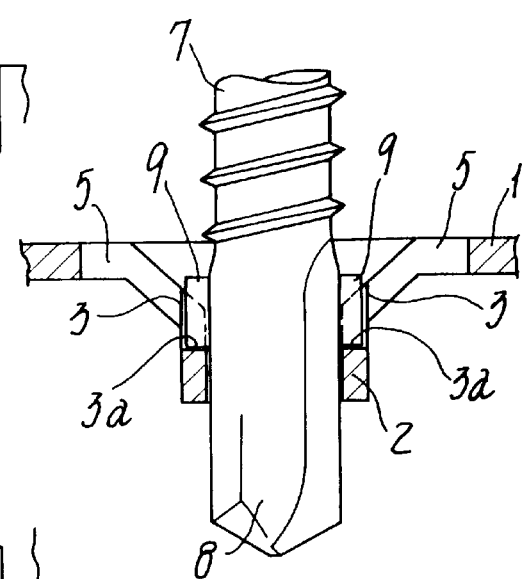

BELT FOR HOLDING AND CARRYING A ROW OF SELF-DRILLING REAM SCREWS

BACKGROUND OF THE INVENTION

1. Field of the Invention

The present invention relates to a belt for holding thereon a row of self-drilling screws so as to successively carry them into a power-driven screw-fastening tool (viz., power driver), wherein this tools usually of a portable type does operate at a high speed to drive and fasten those screws one by one to a pair of articles overlying one another. More particularly, the invention relates to such a belt especially adapted to hold and carry those screws each having reaming-blades protruding radially and disposed intermediate its drill bit and its male screw thread.

2. Prior Art

Some screw-holding belts of this type are disclosed in the Japanese Patent Publication No. 2520358. Typical examples are shown in FIGS. 7a, 7b, 8a and 8b of the drawings accompanying this specification.

Those prior art screw-holding belts do each comprise a row of screw-holding cylinders 2 formed in and along a belt body 1. Those simple and round cylinders 2 are disposed at regular intervals on the belt body 1 that is a band made of a soft flexible plastics. Each cylinder is adapted to receive and hold one screw at a threaded shank 7 thereof, wherein the screw has a head and a drill tip 8. Four slits 3 extend radially and outwardly from each screw-holding cylinder 2, in a pattern of the letter X. The outer ends of the slits 3 shown in FIG. 7a continue to round holes 4, whereas the ends of slits in FIG. 8a gradually increase their width towards their outer extremities to thereby form pointed and elongate holes 5. Only the upper inlet-side half of each screw-holding cylinder 2 in FIG. 8a is of a frustoconical or funnel shape opened upwards (towards the screw's head), so that the elongate holes 5 are formed in the conical wall of said inlet-side upper half. Such round or elongate holes 4 or 5 assist each cylinder 2 to expand and be broken. Thus each self-drilling screw's head will be allowed to pass easily and smoothly through said cylinder when a driver bit of the power driven apparatus strikes the screw off the belt body 1. Both the lateral sides of the belt body have cutouts 6 disposed at the same pitch as the screw-holding cylinders 2 so that the belt is caused to advance intermittently.

Soft articles of a wooden plate, a ply wood plate or the like are sometimes fixed to harder articles, for example those which are formed of profiled steels. The self-drilling screws used in such a case usually comprise reaming blades 9. Due to these reaming blades protruding radially and outwardly from the proximal ends of the drill bits 8 in a manner shown in FIGS. 7b and 8b, such screws are sometimes called "self-drilling reaming screws" (and hereinafter will be referred to as such).

It is however noted that although it has been necessary even for the self-drilling screws having such reaming blades to be fed automatically and intermittently, it has not been possible to hold them on any belt of the described structure. This is because the inner diameter of each screw-holding cylinder 2 is slightly smaller than the core diameter of the shank 7, whereas the reaming blades 9 protrude outwards beyond the crests of screw threads. In other words, such blades have been likely to give more or less damages to the cylinders 2 when inserted therein. If the blades 9 would undesirably be forced in the slits 3, then the former would be jammed on the latter's inner ends 3a (facing an inlet-side opening of the cylinder). In such an event, a lower outlet-side portion of the cylinder 2 would be cut off, thus failing to hold the screws upright relative to the belt body 1. As a result it has been almost impossible to employ any screw-holding belt for feeding the self-drilling reaming screws to the power-driven screw-fastening tools.

SUMMARY OF THE INVENTION

The present invention was made in view of and for resolving those problems in the prior art. An object of the present invention is therefore to provide a belt for holding and carrying a row of the self-drilling reaming screws such that the latter can be held upright relative to the belt and said belt can be loaded easily with those screws without any problems.

In order to achieve the object, a belt provided herein to receive and hold a row of self-drilling reaming screws each having a head, a threaded shank, a drill tip and reaming blades disposed on a portion of the drill tip adjacent to the shank, does comprise a belt body that is a band made of a flexible plastics sheet, a row of screw-holding cylinders formed integral with and along the belt body. The screw-holding cylinders are disposed between lateral sides of the belt body and at a pitch so that the screws are capable of being inserted into and held by the cylinders at regular intervals. A plurality of slits extend in a centrifugal direction from each screw-holding cylinder, and lateral cutouts are formed in and along both the lateral sides at the same pitch as the cylinders so as to allow the belt to be driven in an intermittent manner. Each screw-holding cylinder defines therein a central cavity whose inlet-side opening (i.e., entrance) is located flush with the belt body and above an outlet-side opening (i.e., exit) in the drawings, in particular in FIG. 2. The central cavity is of a generally prismoidal shape (and has a generally square contour in any horizontal cross section as seen from FIG. 1 in combination with FIG. 2). Thus, there are present corner regions in addition to flat walls vertically slanted to face one another, wherein a distance A between those flat walls gradually and smoothly decreases towards the exit. At the entrance, the distance A is substantially the same as a diameter $d_1$ of an imaginary circle surrounding the threaded shank and enveloping the reaming blades. Every two of the slits, that are disposed diametrically with respect to the cylinder and extend obliquely along inlet-side portions of the corner regions, have inner ends spaced apart from each other a further distance B that is also substantially the same as the diameter $d_1$ of the imaginary circle.

Preferably, the belt as just summarized above may further comprise slanted guide slopes that are formed as inner surfaces of the respective corner regions of the prismoidal screw-holding cylinder. These guide slopes continue from the inner ends of the slits and have each a width gradually increasing towards the outlet-side opening of said cylinder.

In use of the belt thus loaded with the screws that have to be driven into any desired article, the corner regions will be torn or broken by each screw when the power-driven tool pushes and drives its head to pass through the cylinder and towards the article.

BRIEF DESCRIPTION OF THE DRAWINGS

In the drawings illustrating the present invention,

FIG. 7a is a plan view of one type of the prior art belts comprising cylinders for holding the self-drilling reaming screws;

FIG. 7b is a vertical cross section of the belt shown in FIG. 7a, with one of the screws being inserted into one of the cylinders;

FIG. 8a is a plan view of the other type prior art belt for the self-drilling reaming screws; and FIG. 8b is also a vertical cross section of the belt shown in FIG. 8a, and corresponding to FIG. 7b, the one screw is being inserted into the cylinder.

DETAILED DESCRIPTION OF THE PREFERRED EMBODIMENTS

Figure 1:
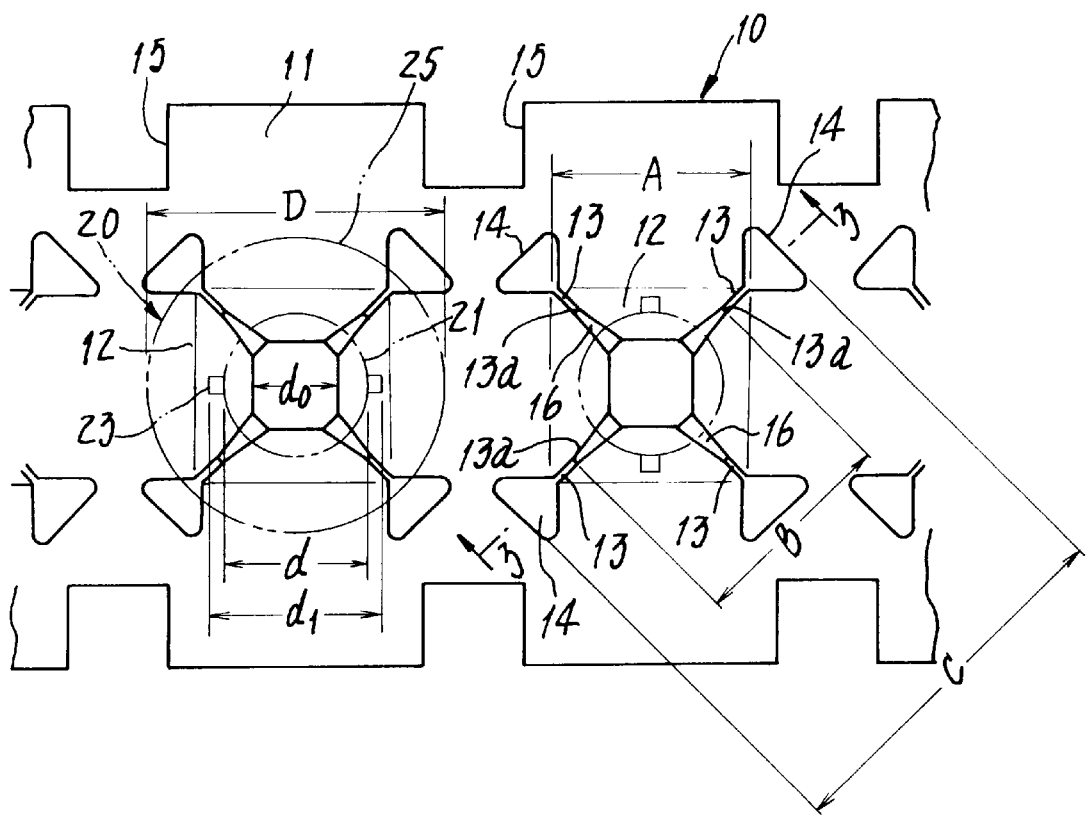
FIG. 1 is a plan view of a screw-holding belt provided herein to hold in cylinders formed therein a row of self-drilling reaming screws.
Figure 2:
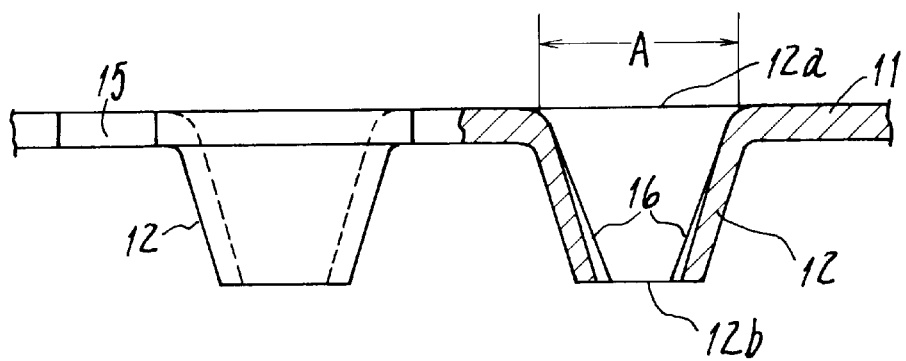
FIG. 2 is a front elevation of the band, illustrated partly in vertical cross section and showing pairs of side walls facing one another, with each pair defining portions of the screw-holding cylinder.
Figure 6:
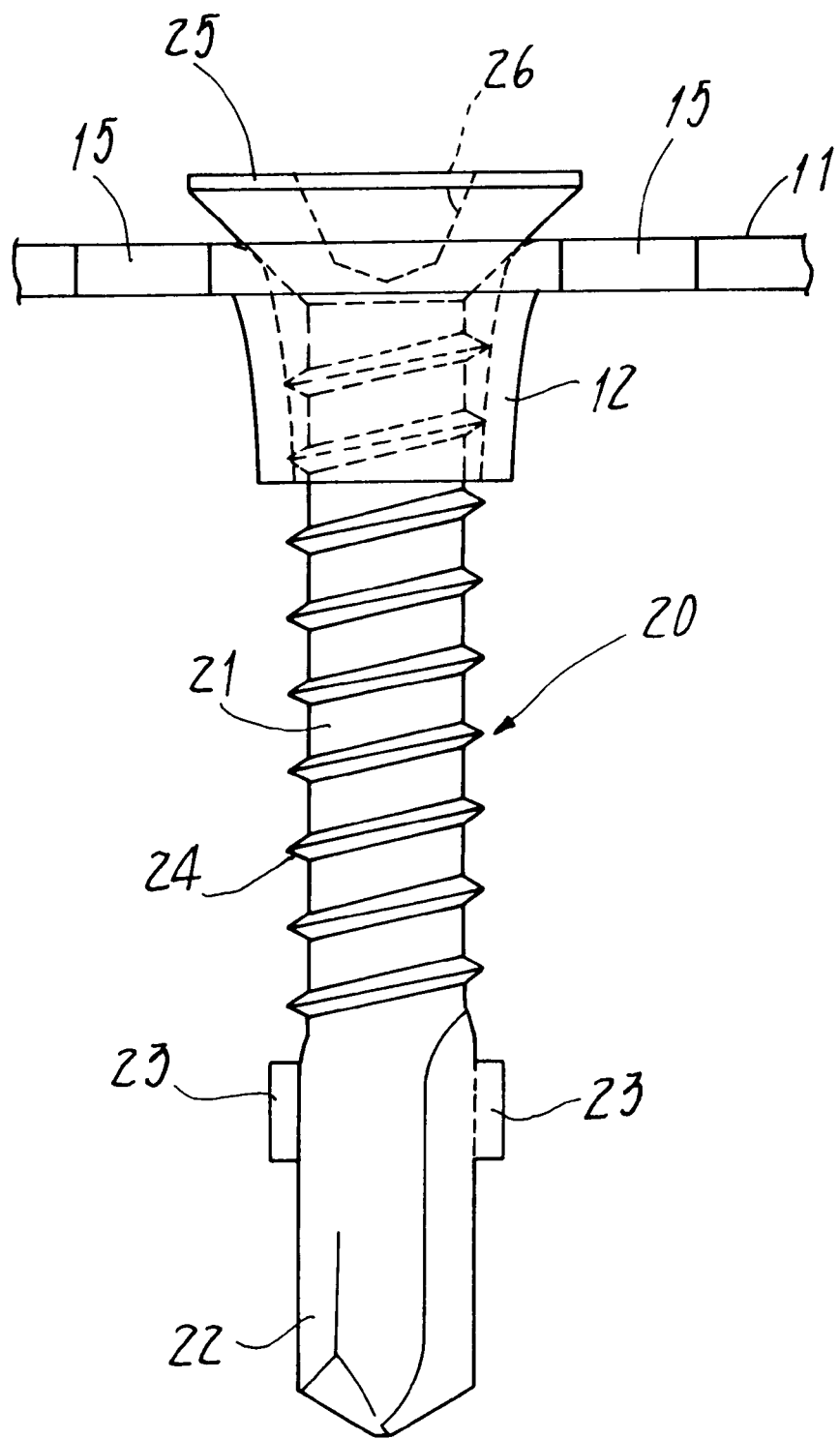
FIG. 6 is a front elevation of the cylinder in which the self-drilling reaming screw has been set in place.

FIGS. 1 and 2 show a belt 10 for holding a row of self-drilling reaming screws each having a pair of reaming blades. Similarly to the prior art products, this belt 10 comprises a belt body 11 formed of a soft flexible plastics such as a polypropylene. Screw-holding cylinders 12 are formed integral with and along the belt body 11, at a given pitch. Four slits 13 formed in the vicinity of each cylinder extend radially and outwardly thereof. Outer ends of those slits continue to triangular holes 14, respectively. Both the lateral sides of such a belt body 11 have cutouts 15 arranged at the same pitch as the screw-holding cylinders 12. Those cutouts will serve as means for causing the belt 10 to advance in an intermittent manner. On the other hand, each of self-drilling screws 20 to be held on and carried by such a belt comprises a shank 21 whose distal end is formed as a drill tip 22, as shown in FIG. 6. Each screw further has a pair of reaming blades 23 formed thereon and disposed between the shank's thread 24 and the drill tip 22. More in detail, those blades 23 protrude in opposite directions from the tip's portion located adjacent to the front or distal end of said thread, so that they are arranged diametrically with respect to the threaded shank 21. This shank has a rear or proximal end continuing to a head 25, which in turn has formed therein a recess 26 for engagement with a driver bit not shown.

Figure 3:
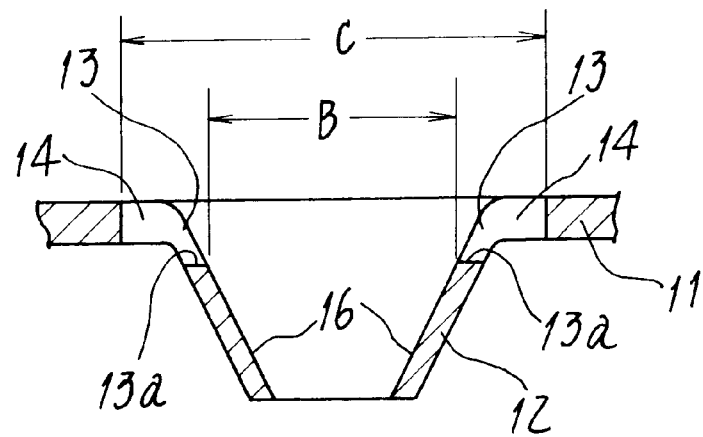
FIG. 3 is a cross section taken long the line 3—3 in FIG. 1 and showing a pair of corner regions that face one another to define other portions of the screw-holding cylinder.

As best seen in FIGS. 1 to 3, a central cavity of each screw-holding cylinder 12 perpendicular to the belt body is generally of such a prismoidal shape as gradually reducing its diametrical dimension towards its bottom or exit. At a top or entrance 12a of the cylinder 12, its varying width or distance A defined between generally flat but vertically slanted walls facing one another is greater than the constant external diameter d of the thread 24. However, this width A is substantially the same as the diameter $d_1$ of an imaginary circle enveloping the reaming blades 23. The distance A noted above is reduced to $d_0$ at a bottom or exit 12b of the cylinder 12 so as to be slightly smaller than a core diameter of the threaded shank 21. Four slits 13 are formed in the belt body, partly along and partly beyond four corner regions of the screw-holding cylinder 12, respectively, wherein each corner region is interposed between two adjacent flat walls of said cylinder. Outer ends of slits 13 continue to the respective triangular holes 14 formed in the belt body 11. Those slits 13 thus extending obliquely and outwardly from upper inlet-side ends of the respective corner regions have their inner ends 13a spaced apart a further distance B from each other in a diametric direction. This further distance B is, as seen in FIGS. 1 and 3, also substantially the same as or slightly greater than the diameter $d_1$ of the imaginary envelope circle of the reaming blades 23. Another distance C between the outer ends of two triangular holes 14 diametrically opposed to each other is significantly greater than the diameter of the head 25 of each self-drilling reaming screw 20. Slanted guide slopes 16 are provided as the inner surfaces of the respective corner regions of the prismoidal screw-holding cylinder 12. These guide slopes continue from the inner ends 13a of the slits 13 and have each a width gradually increasing towards the exit 12b of said cylinder. Each guide slope is thus of an elongated triangle, giving the exit 12b a generally octagonal appearance in its plan view. As will be detailed below, those guide slopes 16 protect the corner regions from being injured and/or broken with the reaming blades 23 even if the latter would occasionally be forced in the slits 13 when inserting and setting the screw's shank 21 in the prismoidal cylinder 12. In a modified example of the embodiment, each of the guide slopes 16 is of a concave shape rendering generally rectangular the opening of exit 12b to have rounded corners. In another modification, these concave guide slopes are enlarged to such an extent as making circular the exit's opening.

Figure 4:
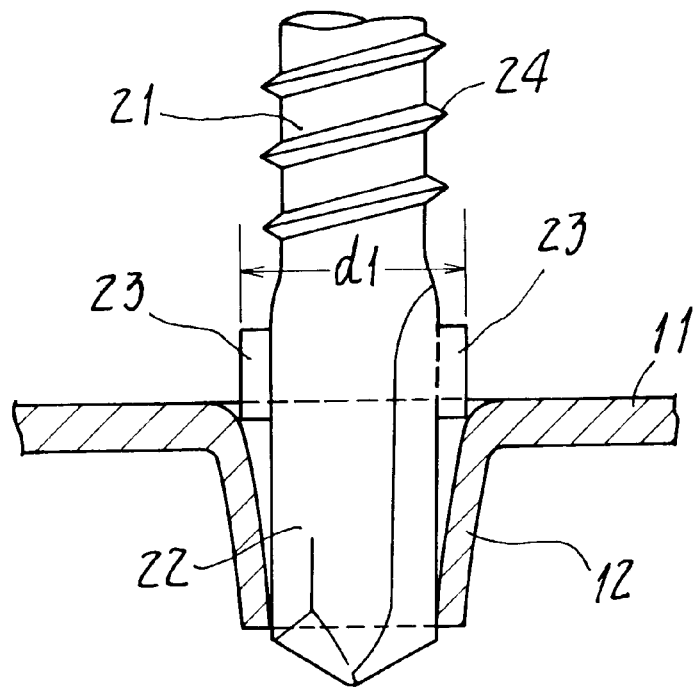
FIG. 4 is a vertical cross section corresponding to FIG. 2 with respect to the side walls, wherein one of the self-drilling reaming screws that is being inserted into the cylinder.
Figure 5:
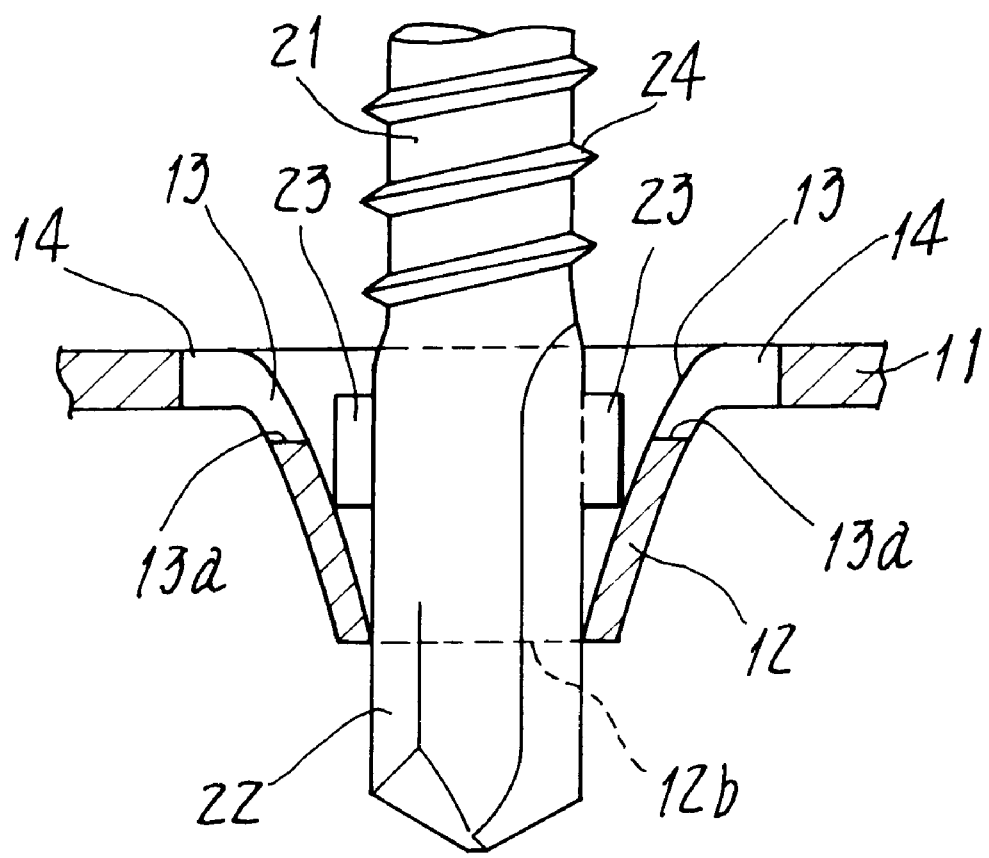
FIG. 5 is another vertical cross section corresponding to FIG. 3 with respect to the corner regions, with the self-drilling reaming screw also being inserted into the cylinder.

In operations for setting the self-drilling reaming screws 20 in place in the prismoidal cylinders 12 of the belt 10, there will take place two alternative cases at random. In one case, the shanks 21 of said screws take an angular position where their reaming blades 23 do face the flat walls defining the cavity in each cylinder in a manner shown in FIG. 4. In another case shown in FIG. 5, the reaming blades will face the corner regions also defining the cavity in each cylinder. The flat walls will be pressed outwards, in the former case, to temporarily expand each cylinder 12 to such an extent that this cylinder allows those blades 23 to pass therethrough. However in the latter case, a satisfactory effect will be afforded by the feature that the inner edges 13 of the two slits diametrically facing one another are spaced the distance 'B' equal to or slightly greater than the imaginary circle enveloping the reaming blades. In fact, those blades being forced in will smoothly advance along the corner regions while temporarily expanding a diametrical distance between the corner regions facing one another. Although a maximum temporary deformation is produced at or near the outlet-side opening 12b when each screw is inserted into the cylinder, the slanted guide slopes 16 will surely protect the corner regions from being broken with the reaming blades 23 while permitting same to smoothly pass through the prismoidal cylinder 12. Due to elastic recovery of the described deformation, this cylinder 12 will shrink instantly upon passage of the blades 23 to thereby grip the shank 24 firmly at its portion below and adjacent to the head 25. In this state, the threaded shank is secured in position mainly by the flat walls' lower halves surrounding said shank and located adjacent to the outlet opening of each cylinder. Those lower halves will generally symmetrically impart centripetal portions of the gripping force to the threaded shank. As a result, all the self-drilling reaming screws 20 will be held on and by the belt body 11 to take a normal upright position relative thereto.

In summary, the prismoidal cylinders proposed herein makes it possible for the belt to hold thereon each self-drilling reaming screws at a correct position perpendicular to the belt body. Consequently, the automatic loading of the belt body with the screws can now be done efficiently without any trouble that has been inherent in the prior art belt.

What is claimed is:

1. A belt for holding and carrying a row of self-drilling reaming screws each having a head, a shank continuing therefrom, a thread formed around the shank, a drill tip continuing from the shank and reaming blades that are disposed on a portion of the drill tip adjacent to the shank and protrude sideways beyond an external diameter of the thread, the belt comprising:

a belt body that is a band made of a flexible plastics sheet;

a row of screw-holding cylinders formed integral with and along the belt body;

the cylinders extending perpendicular to the belt body and arranged between lateral sides of the belt at a pitch so that the screws are capable of being inserted in and held by the cylinders at regular intervals;

a respective plurality of slits formed in a portion of the belt body closely adjacent to each screw-holding cylinder, so that the slits extend centrifugally from said cylinder and have inlet side portions diametrically opposed to each other with respect to said cylinder;

lateral cutouts formed in and along both the lateral sides at the same pitch as the cylinders so as to allow the belt to be driven in an intermittent manner;

each screw-holding cylinder having an inlet-side opening, an outlet-side opening, flat walls and corner regions each interposed between two adjacent said flat walls so as to define a central cavity between the inlet-side and outlet-side openings and surrounded by the flat walls and the corner regions; the central cavity through the cylinder being generally of a prismoidal shape with a generally square horizontal cross section; and the flat walls being vertically slanted so that a distance A between two of said flat walls facing one another decreases gradually-towards the outlet-side opening, wherein the distance A at the inlet-side opening is substantially the same as but not less than a diameter d of an imaginary circle the would envelope the reaming blades of an inserted screw, and wherein the slits obliquely extend partly along and partly outside the inlet-side portions of the corner regions, so that inner ends of the two slits facing one another are spaced apart from each other a further distance B that is also substantially the same as but not less than the diameter d of the imaginary circle.

2. A belt as defined in claim 1, further comprising slanted guide slopes formed as inner surfaces of the corner regions of each the prismoidal screw-holding cylinder, wherein the guide slopes continue from the inner ends of the slits and have each a width gradually increasing towards the outlet-side opening of said cylinder.

* * * * *